(12) United States Patent
Shih et al.

(10) Patent No.: US 6,985,202 B2
(45) Date of Patent: Jan. 10, 2006

(54) BIASED BENDING VERTICAL ALIGNMENT LIQUID CRYSTAL DISPLAY

(75) Inventors: Po-Sheng Shih, TaoYuan (TW); Chen Kuo Tzune, TaoYuan (TW)

(73) Assignee: HannStar Display Corporation (TW)

( * ) Notice: Subject to any disclaimer, the term of this patent is extended or adjusted under 35 U.S.C. 154(b) by 0 days.

(21) Appl. No.: 10/939,236

(22) Filed: Sep. 10, 2004

(65) Prior Publication Data

US 2005/0030462 A1 Feb. 10, 2005

Related U.S. Application Data

(63) Continuation-in-part of application No. 10/813,313, filed on Mar. 30, 2004, which is a continuation-in-part of application No. 10/154,716, filed on May 24, 2002, now Pat. No. 6,803,981.

(30) Foreign Application Priority Data

May 21, 2004 (TW) ........................................ 93114569 A

(51) Int. Cl.
G02F 1/1343 (2006.01)
G02F 1/1337 (2006.01)

(52) U.S. Cl. ........................ 349/143; 349/130; 349/139

(58) Field of Classification Search ................. 349/129, 349/130, 139, 143
See application file for complete search history.

(56) References Cited

U.S. PATENT DOCUMENTS

| | | | |
|---|---|---|---|
| 5,136,407 A | 8/1992 | Clerc | 349/130 |
| 5,309,264 A * | 5/1994 | Lien et al. | 349/143 |
| 5,886,762 A | 3/1999 | Lee et al. | 349/139 |
| 5,953,092 A | 9/1999 | Sung et al. | 349/143 |
| 6,115,093 A | 9/2000 | Murai et al. | 349/129 |
| 6,157,428 A | 12/2000 | Koma | 349/123 |
| 6,177,976 B1 | 1/2001 | Murai et al. | 349/191 |
| 6,466,288 B1 | 10/2002 | Rho | 349/141 |
| 6,788,374 B2 * | 9/2004 | Ko et al. | 349/129 |
| 6,856,367 B2 * | 2/2005 | Yoo et al. | 349/129 |
| 2003/0107695 A1 | 6/2003 | Kubo et al. | |
| 2004/0169808 A1 * | 9/2004 | Shih et al. | 349/141 |

OTHER PUBLICATIONS

U.S. Appl. No. 2003/0112397, filed Jun. 2003, Seok–Lyul Lee et al.

* cited by examiner

Primary Examiner—Tarifur R. Chowdhury
(74) Attorney, Agent, or Firm—Volpe and Koenig, P.C.

(57) ABSTRACT

A liquid crystal display, especially relative to a liquid crystal display utilizing the BBVA technique, is provided. The liquid crystal display has a first substrate having a first electrode thereon, a second substrate having a second electrode having at least a hole, a liquid crystal layer located between the first substrate and the second substrate, a third electrode located between the second electrode and the second substrate and a fourth electrode located on the third electrode. The third electrode is located corresponding to the hole of the second electrode, and the fourth electrode has at least a portion located inside the hole of the second electrode.

36 Claims, 16 Drawing Sheets

BIASED BENDING VERTICAL ALIGNMENT LIQUID CRYSTAL DISPLAY

FIELD OF THE INVENTION

The present invention is a CIP application of the parent application "Liquid Crystal Display" bearing on the Ser. No. 10/813,313 and filed on respectively Mar. 30, 2004, which is a CIP of Ser. No. 10/154,716, filed May 24, 2002 now U.S. Pat. No. 6,803,981. The present invention relates to a LCD (Liquid Crystal Display), especially to a BBVA (Biased Bending Vertical Alignment) LCD.

BACKGROUND OF THE INVENTION

The LCD (Liquid Crystal Display) has been broadly used in various applications in the daily life with the improvement and popularity of the digital network technology. Nowadays, the image quality of the LCD is nip and tuck with that of the CRT (Cathode Ray Tube) display. However, there are still some problems for the LCD needed to be improved and solved, such as the small viewing angle, the low contrast ratio, the long responding time, and the non-uniform displaying.

Many techniques are developed for obtaining a wider viewing angle of the LCD. Among so many WVA (Wide Viewing Angle) techniques, for example, the MVA (Multi-domain Vertical Alignment) technique is the technique utilizing the properties of the non-identical directions in arrangements and rotations of the LC (Liquid Crystal) molecules to increase the viewing angle and shorten the responding time of the LCD.

Please refer to FIG. 1, which illustrates the known MVA technique well. When a voltage is applied to the LCD by a transistor, the LC molecules will be promoted to align in various directions by the surface prominence, such as bumps and protrusions. The working principle adapted for the known MVA technique is described in the following.

As shown in FIG. 1, a known LCD 1' is mainly formed by an upper substrate 11' and a lower substrate 13'. The LC layer 12' is located therebetween. A first electrode 111' is located between the upper substrate 11' and a second electrode 131' is located between the lower substrate 13' and the LC layer 12'. The first electrode 111' and the second electrode 131' further respectively have a plurality of surface prominences located thereon, such as 112' and 132'. The surface prominences 112' and 132' are able to affect the electric field applied thereon and each pixel of the LCD is thus divided into multiple domains.

The MVA technique carries out a shorter response time for signals, a wider viewing angle and a higher contrast. Furthermore, this technique is always helpful to improve the displaying uniformity and is able to provide a more perfect image quality for the LCD 1'. However, the difficulty of manufacturing the surface prominences (e.g. 112' and 132') on the electrodes is hardly overcome and much time-consuming, which results in a higher product cost for the LCD 1'.

The BBVA (Biased Bending Vertical Alignment) technique, another application in the WVA techniques, relates to adjusting the arrangements and rotates of the LC molecules in various directions by means of the electricity. Please refer to FIG. 2, which illustrates the structure of a known BBVA LCD and the working principle thereof. The LCD 2' is constructed of an upper substrate 21' and a lower substrate 23', which respectively have a first electrode 211' and a second electrode 231'. Additionally, the second electrode 231' (i.e. the pixel electrode for the BBVA LCD 2') further has plural holes 232' thereon. The third electrode 233' (i.e. the biased electrode especially for the BBVA LCD 2') is located between the second electrode 231' and the lower substrate 23' and corresponding to the hole 232'. The LC molecules 22' will be aligned and rotated in various directions due to the functions of the second electrode 231' and the third electrode 233'. The effect of multi-domain division is hence achieved. Furthermore, the complicated manufacturing process of the surface prominence for the conventional MVA technique is never needed and the BBVA technique has more potential in applications therefore.

However, some problems still exist in the BBVA LCD application, e.g. the disclination of the LC molecules. The LC molecules 22' will be aligned disclinatedly on the fringe of the overlapping field of the second electrode 231' and the third electrode 233'. Disclinations of the LC molecules result in delaying the responding time and the twinklingly displaying for the BBVA LCD.

Please refer to FIG. 3, which illustrates the structure of electrodes in another known BBVA LCD. The second electrode 31' (i.e. the pixel electrode) in the BBVA LCD has a plurality of apertures 311', and the third electrode 32' (i.e. the biased electrode) is positioned under the second electrode 31' and opposite to the apertures 311', which enables the BBVA LCD to have a shorter response time and the twinkling phenomenon in displaying can be inhibited. However, for preventing the LC molecules from the disclination, the voltage difference between the voltage applied on the second electrode 31' and that applied on the third electrode 32' would be high, which is another drawback needed to be overcome.

Please refer FIG. 4, for example, when the voltage of the first electrode (not shown) is 0V, a voltage of 7V and a voltage of 10V are respectively applied on the second electrode 31' and the third electrode 32', and the voltage difference therebetween is still not enough to prevent the existence of the disclination 331' in the BBVA LCD. In other words, a higher voltage difference is necessary to be applied for eliminating the disclination 331', which would be a limiting factor in the application and the product cost, however.

Based on the above discussions, it is clear that for improving the practicability and utility of the BBVA technique, problems of the LC molecule disclinations have to be solved in combination of lowering the voltages respectively applied on the bias electrode. In order to overcome the drawbacks in the prior art, an improved BBVA LCD is provided in the present invention.

SUMMARY OF THE INVENTION

The main purpose of the present invention is to provide an improved BBVA (Biased Bending Vertical Alignment) LCD (Liquid Crystal Display), in which the disclination of the LC (Liquid Crystal) molecules is prevented when a low voltage difference is applied thereon.

According to one aspect of the present invention, a liquid crystal display is provided, which includes: a first substrate having a first electrode thereon, a second substrate having a second electrode having at least a hole, wherein the second electrode faces to the first electrode, a liquid crystal layer located between the first substrate and the second substrate, a third electrode located between the second electrode and the second substrate, wherein the third electrode is located corresponding to the hole of the second electrode and a fourth electrode located on the third electrode, wherein the fourth electrode has at least a portion located inside the hole of the second electrode.

Preferably, the second electrode further has plural slits and each of the plural slits is located on a defined side of the hole.

Preferably, each of the plural slits has a longitudinal direction in parallel to that of the third electrode.

Preferably, the hole of the second electrode is an elongated hole.

Preferably, the elongated hole has a longitudinal direction parallel to that of the third electrode and the fourth electrode.

Preferably, the elongated hole has a longitudinal direction perpendicular to that of the third electrode and the fourth electrode.

Preferably, the elongated hole has a longitudinal direction perpendicular to that of the third electrode and the fourth electrode further has at least an island-shaped electrode.

Preferably, the island-shaped electrode has a longitudinal direction parallel to that of the elongated hole.

Preferably, the island-shaped electrode has a longitudinal direction perpendicular to that of the elongated hole.

Preferably, the third electrode has a width larger than that of the hole of the second electrode.

Preferably, the fourth electrode has a width smaller than that of the hole of the second electrode.

Preferably, the fourth electrode has a width larger than that of the hole of the second electrode, and portions of the fourth electrode and the second electrode are overlapping.

Preferably, the third electrode and the fourth electrode have an equal potential.

Preferably, the potentials of the third electrode and the fourth electrode are equaled biased potentials.

Preferably, the third electrode has a floating potential and the fourth electrode has a biased potential.

Preferably, the third electrode has a floating potential and the fourth electrode has a biased potential.

Preferably, the third electrode and the fourth electrode are respectively made of a first metal layer and a second metal layer and an insulating layer is further located between the third electrode and the fourth electrode.

Preferably, the fourth electrode and the insulating layer further have a passivation layer thereon and the second electrode is located on the passivation layer.

Preferably, the third electrode and the fourth electrode have a thickness in a range of 100~4000 Å, respectively.

Preferably, the insulating layer has a thickness in a range of 100~5000 Å.

Preferably, the passivation layer has a thickness in a range of 100~5000 Å.

Preferably, the second electrode has a thickness in a range of 200~2500 Å.

The second purpose of the present invention is to provide a method for manufacturing an improved BBVA LCD.

According to another aspect of the present invention, the method for manufacturing a LCD includes the following steps of providing a substrate, forming a first electrode on the substrate, forming an insulating layer on the substrate to cover the first electrode, forming a second electrode on the insulating layer, forming a passivation layer on the substrate to cover the insulating layer and the second electrode and forming a third electrode on the passivation layer, wherein the third electrode has at least a hole thereon and the first electrode and the second electrode are located respectively corresponding to the hole.

Preferably, the first electrode and the second electrode are made of a first metal layer and a second metal layer, respectively.

Preferably, the third electrode further has plural slits and each of the plural slits is located on a defined side of the hole.

Preferably, each of the plural slits has a longitudinal direction in parallel to that of the first electrode.

Preferably, the hole of the third electrode is an elongated hole.

Preferably, the elongated hole has a longitudinal direction parallel to that of the first electrode and the second electrode.

Preferably, the elongated hole has a longitudinal direction perpendicular to that of the first electrode and the second electrode.

Preferably, the elongated hole has a longitudinal direction in perpendicular to that of the first electrode and the second electrode further has at least an island-shaped electrode.

Preferably, the island-shaped electrode has a longitudinal direction parallel to that of the elongated hole.

Preferably, the island-shaped electrode has a longitudinal direction perpendicular to that of the elongated hole.

Preferably, the first electrode has a width larger than that of the hole of the third electrode.

Preferably, the second electrode has a width smaller that of the hole of the third electrode.

Preferably, the second electrode has a width larger than that of the hole of the third electrode, and the second electrode and the fourth electrode are overlapping.

Preferably, the first electrode and the second electrode have a thickness in a range of 100~4000 Å, respectively.

Preferably, the insulating layer has a thickness in a range of 100~5000 Å.

Preferably, the passivation layer has a thickness in a range of 100~5000 Å.

Preferably, the third electrode has a thickness in a range of 200~2500 Å.

The foregoing and other features and advantages of the present invention will be more clearly understood through the following descriptions with reference to the drawings, wherein:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 5A:
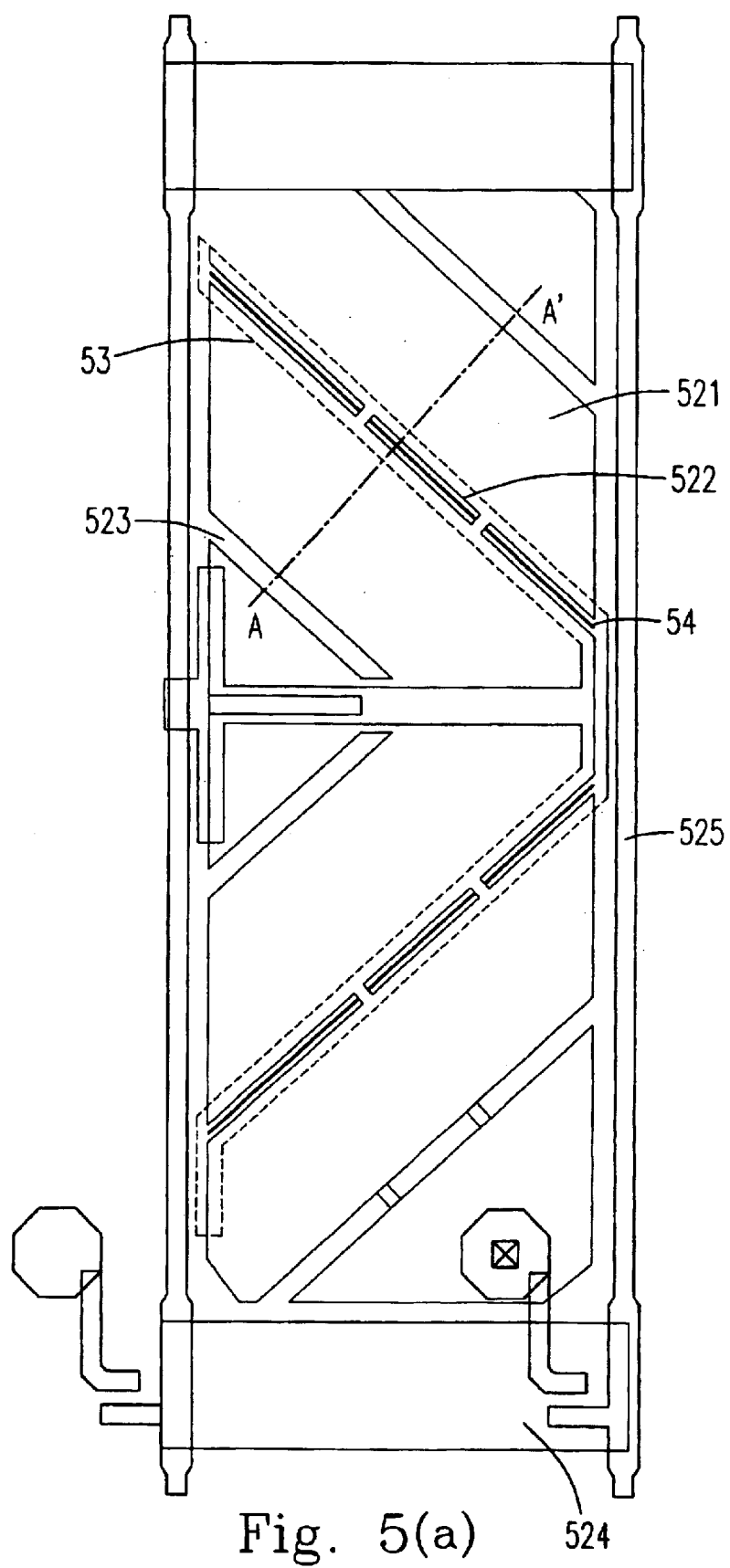
FIG. 5(a) is a top view illustrating the structure of the LCD according to a first preferred embodiment of the present invention.
Figure 5B:
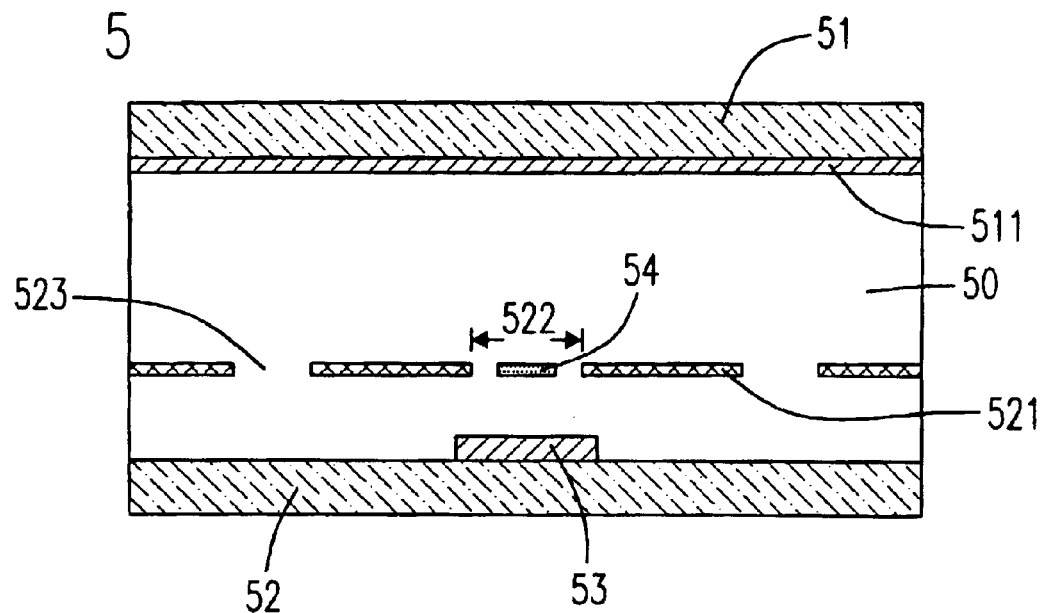
FIG. 5(b) is the cross-sectional view according to the line A–A' in FIG. 5(a)

Please refer to FIG. 5(a), which is a top view illustrating the structure of the LCD (Liquid Crystal Display) according to a first preferred embodiment of the present invention. Also, please refer to 5(b), which is the cross-sectional view according to the line A–A' in FIG. 5(a). The LCD 5 provided in the present invention mainly has a first substrate 51, a LC (Liquid Crystal) layer 50 and a second substrate 52. The first electrode 511 and the second electrode 521 are respectively located on the first substrate 51 and the second substrate 52 and face to each other. The second electrode 521 further has at least an elongated hole 522 and a plurality of slits 523, which are located on both sides of the longitudinal direction of the elongated hole 522 and separate the second electrode 521 into plural sub-electrodes. The third electrode 53, which has a larger width than that of the elongated hole 522, is located between the second substrate 52 and the second electrode 521. Additionally, the third electrode 53 is further located below the elongated hole 522 and has a longitudinal direction parallel to that of the elongated hole 522. Furthermore, the scanning lines 524 and the data line 525 are made of metals, which are respectively the same as the first electrode 511 and the fourth electrode 54.

On the third electrode 53 is the fourth electrode 54 having a longitudinal direction parallel to that of the elongated hole 522 and the fourth electrode 54 has a width smaller than that of the elongated hole 522.

Figure 5C:
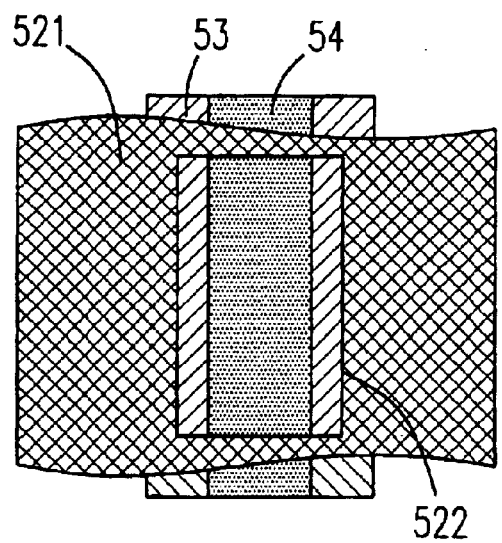
FIG. 5(c) is a top view illustrating the structure of the electrodes in the LCD according to the first embodiment of the present invention.

Please refer to FIG. 5(c), which is a top view illustrating the structure of the electrodes in the LCD according to the first embodiment of the present application. The second electrode 521, the fourth electrode 54 and the third electrode 53 are arranged from top to bottom in order, and the relevant arrangement could be observed through the elongated hole 522.

Figure 1:
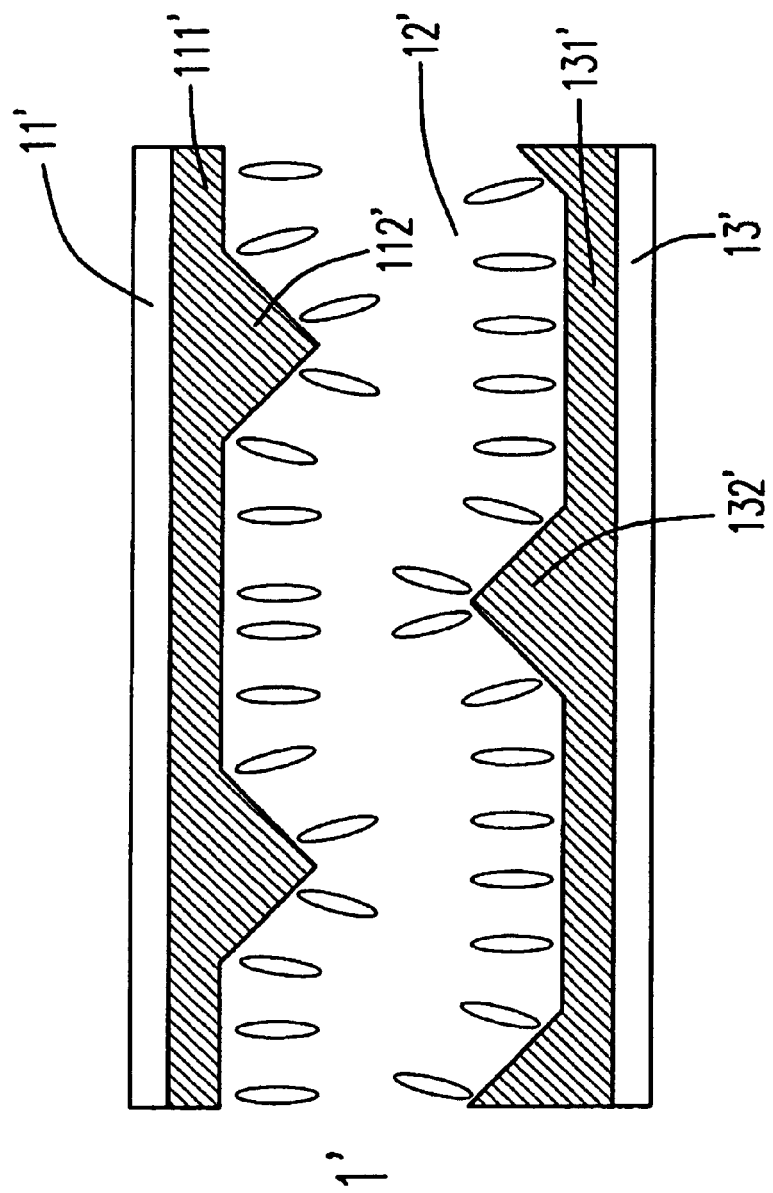
FIG. 1 is a diagram illustrating the structure of the MVA LCD according to the prior art.
Figure 2:
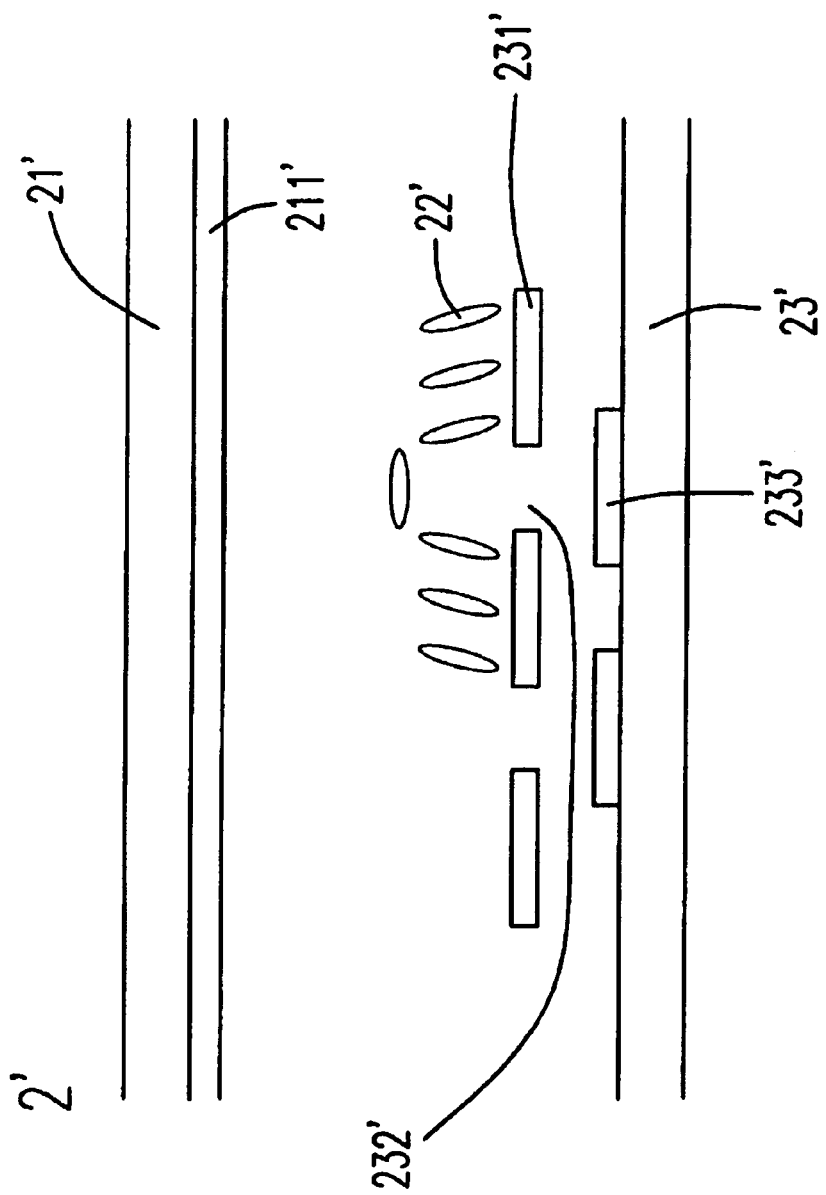
FIG. 2 is a diagram illustrating the structure of the BBVA LCD according to the prior art.
Figure 3:
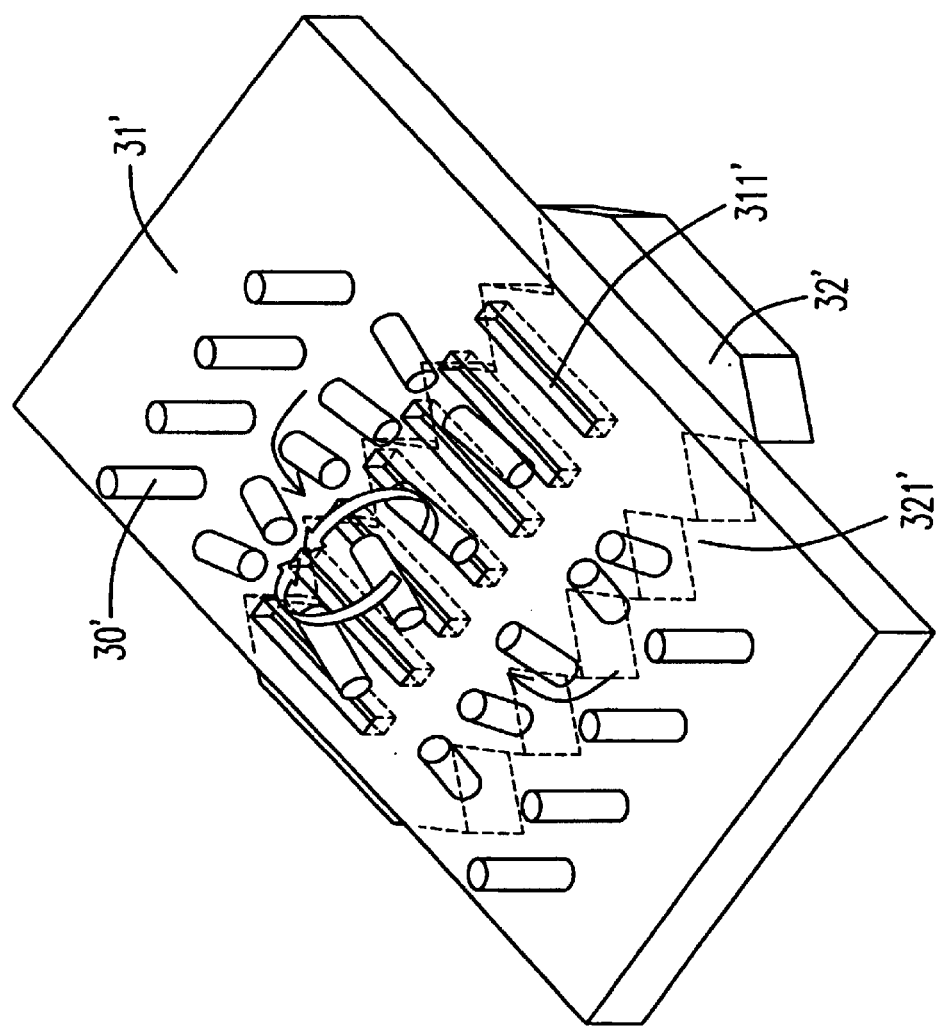
FIG. 3 is a diagram illustrating the structure of the electrodes in another BBVA LCD according to the prior art.
Figure 6A:
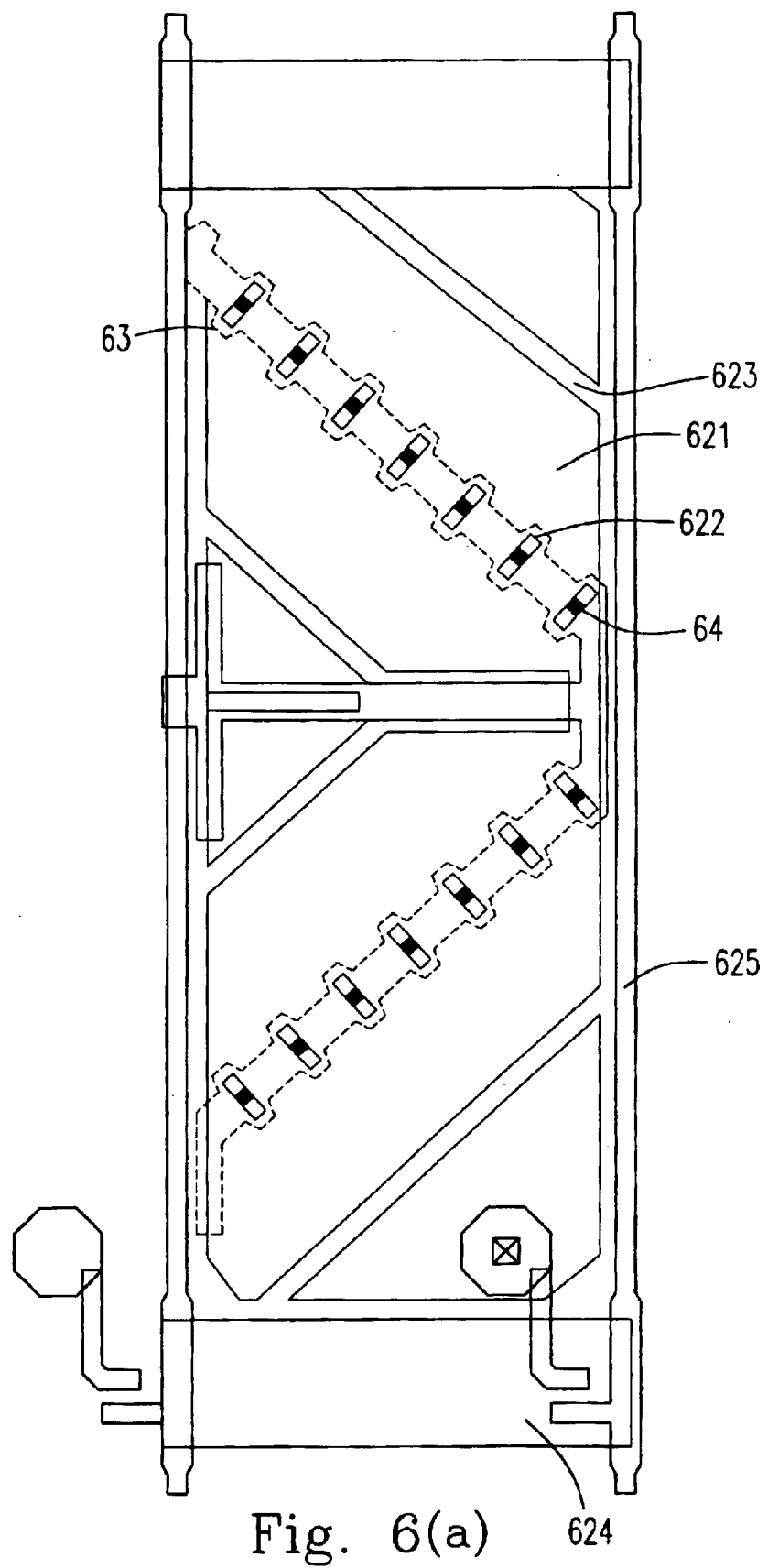
FIG. 6(a) is a top view illustrating the structure of the LCD according to a second preferred embodiment of the present invention.
Figure 6B:
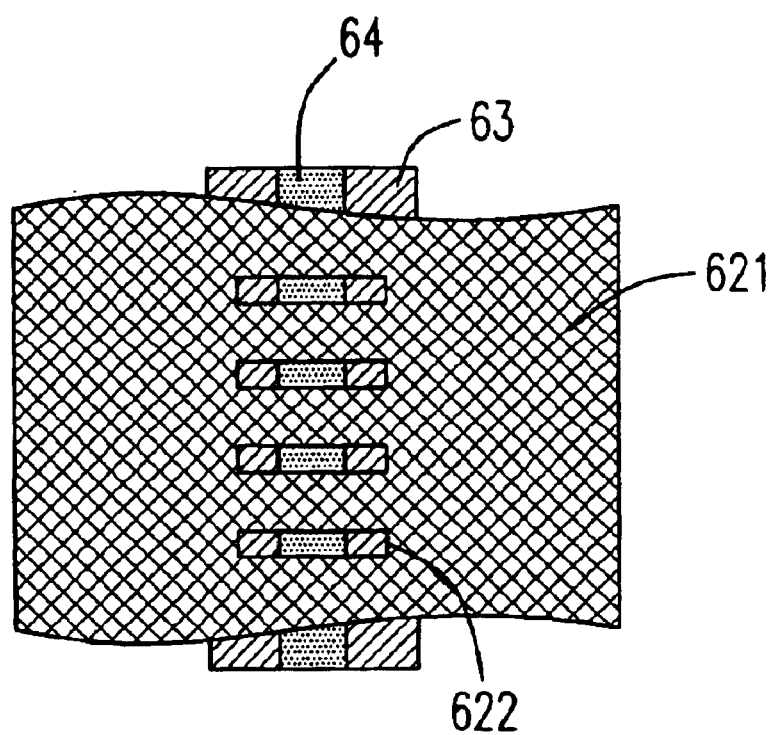
FIG. 6(b) is a top view illustrating the structure of the electrodes in the LCD according to a second embodiment of the present invention.

Please refer to FIG. 6(a), which is a top view illustrating the structure of the LCD according to a second embodiment of the present application. Also, please refer to FIG. 6(b), which is a top view illustrating the structure of the electrodes in the LCD according to the second embodiment of the present application. The fourth electrode 64 is located between the third electrode 63 and the second electrode 621, which has at least an elongated hole 622. Plural slits 623 are formed respectively on both sides of the elongated hole 622 to separate the second electrode 621 into plural sub-electrodes. It is worthy to mention that the difference between the first embodiment and the second embodiment is that the longitudinal direction of the elongated hole 622 is different from that of the elongated hole 522, wherein the longitudinal direction of the elongated hole 622 is perpendicular to those of the third electrode 63 and the fourth electrode 64. Furthermore, the scanning lines 624 and the data line 625 are made of metals, which are respectively the same as the first electrode 611 and the fourth electrode 64. Moreover, the third electrode 63 includes plural indents 321' as shown in FIG. 3 for increasing the aperture ratio of the LCD.

Figure 7A:
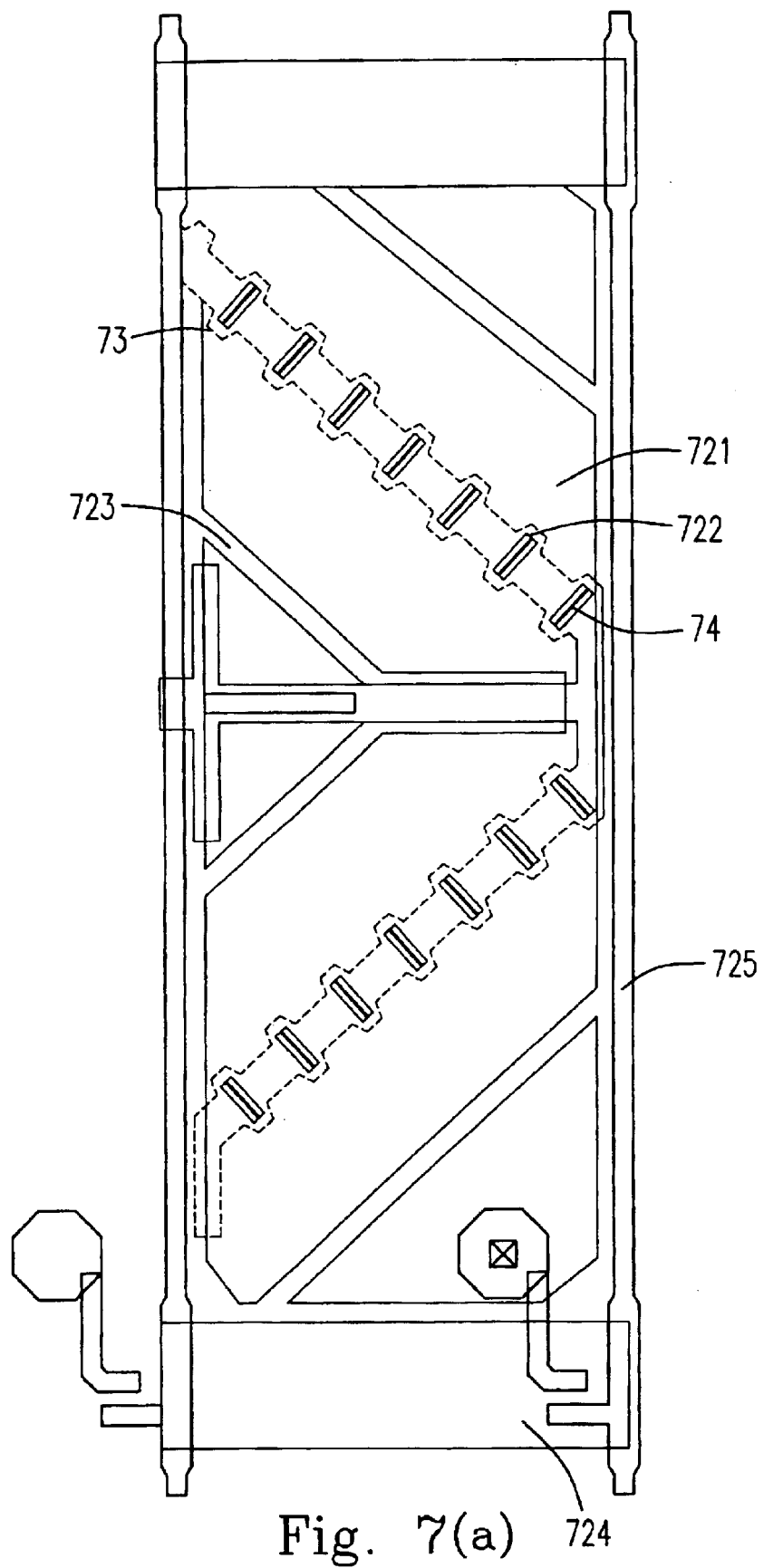
FIG. 7(a) is a top view illustrating the structure of the LCD according to a third preferred embodiment of the present invention.
Figure 7B:
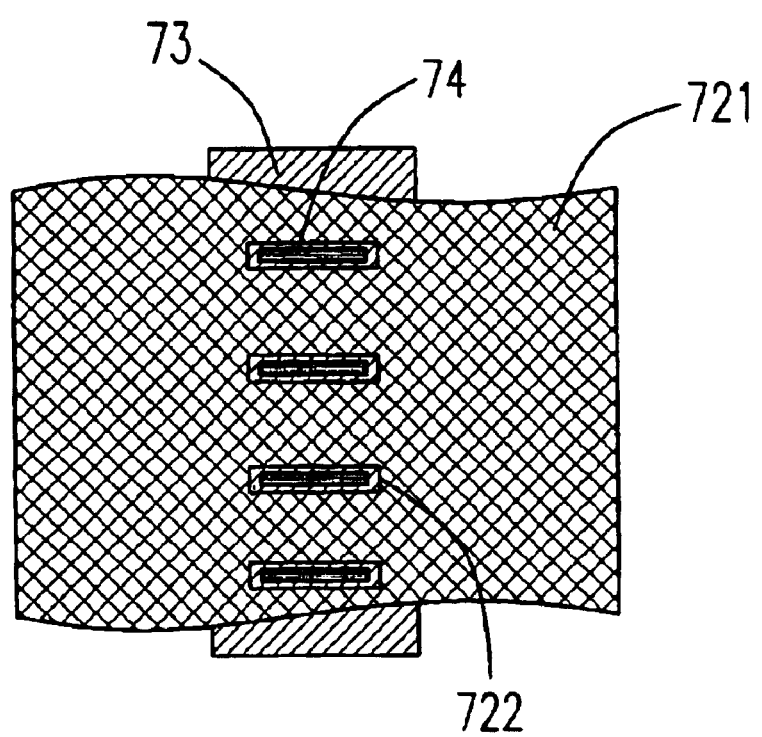
FIG. 7(b) is a top view illustrating the structure of the electrodes in the LCD according to a third embodiment of the present invention.

Please refer to FIG. 7(a), which is a top view illustrating the structure of the LCD according to a third embodiment of the present application. Also, please refer to FIG. 7(b), which is a top view illustrating the structure of the electrodes in the LCD according to the third embodiment of the present application. The difference between the second embodiment and the third embodiment is the fourth electrode 74. The fourth electrode 74 further has at least an island-shaped electrode structure, which has a longitudinal direction parallel or perpendicular to that of the elongated hole 722. Each of the island-shaped electrode structures is electrically independent or electrically connected to each other when there are plural island-shaped electrode structures. Furthermore, the scanning lines 724 and the data line 725 are made of metals, which are respectively the same as the first electrode 711 and the fourth electrode 74.

Figure 4:
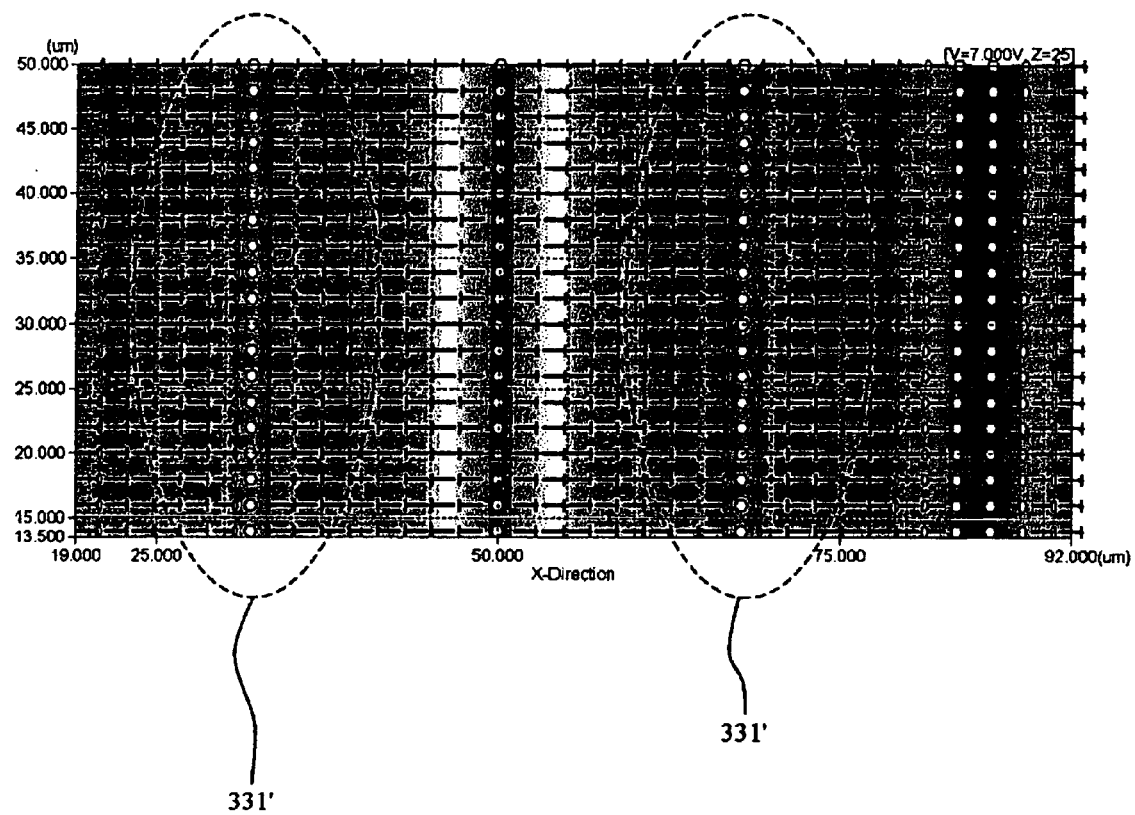
FIG. 4 is a diagram illustrating the arrangement of the LC molecules in the BBVA LCD according to the prior art.
Figure 8A:
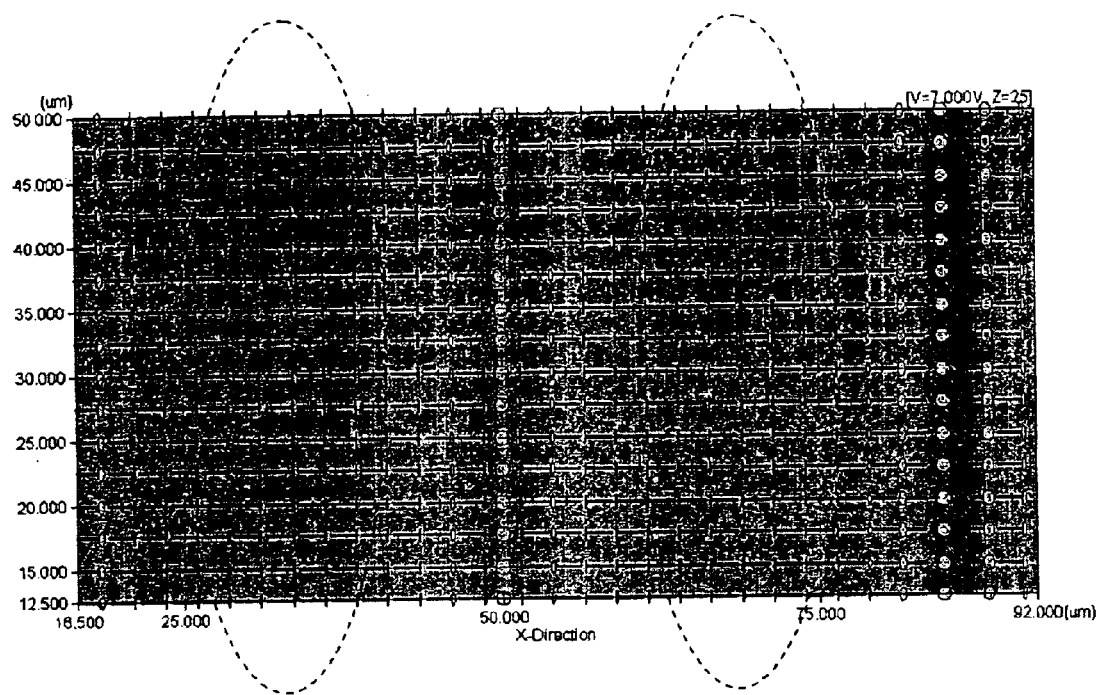
FIGS. 8(a)–8(c) are diagrams respectively illustrating the arrangement of the LC molecules in the BBVA LCDs according to the first, the second and the third embodiments of the present application.
Figure 8B:
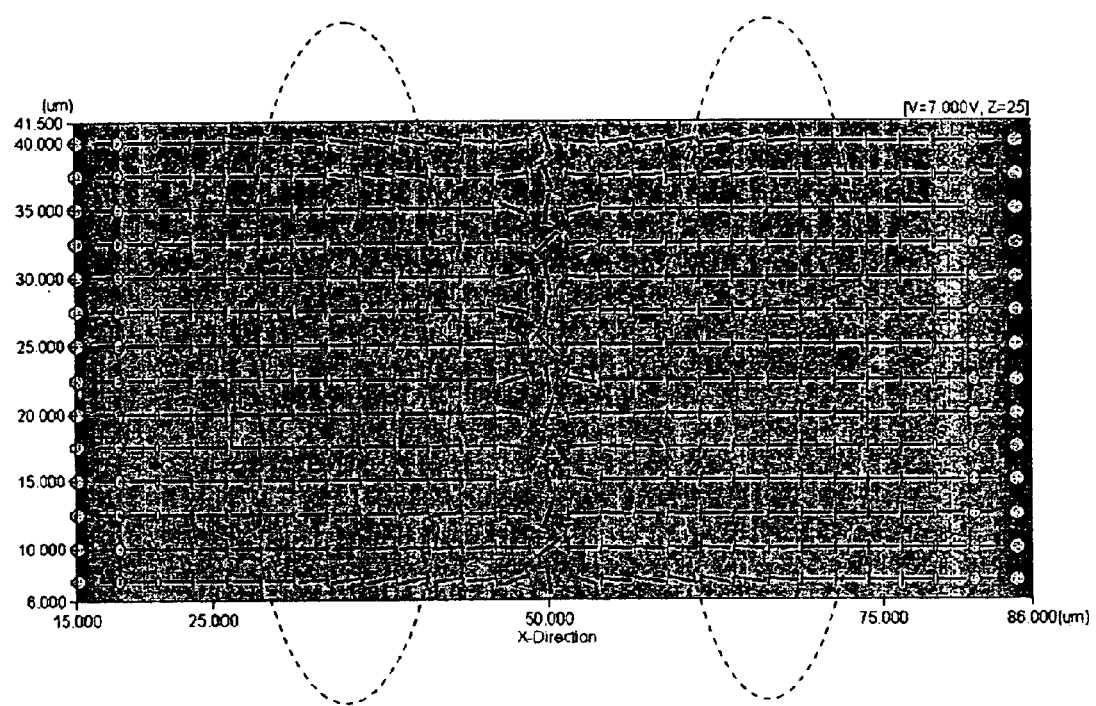
Figure 8C:
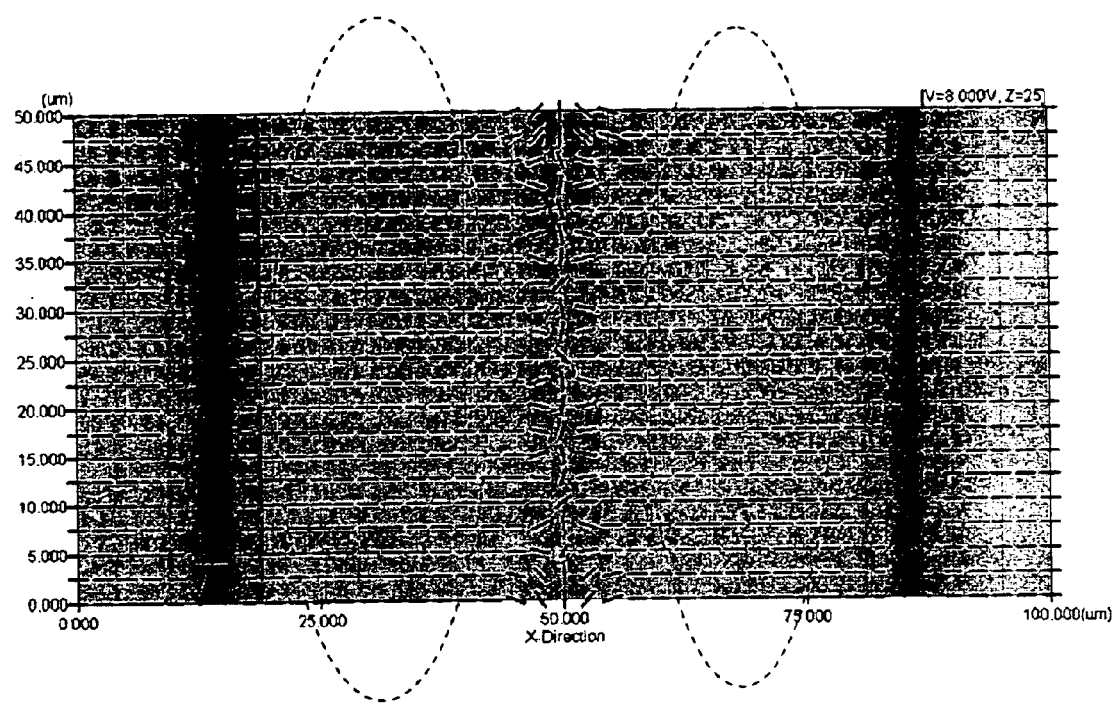

Please refer to FIGS. 8(a)–8(c), which are diagrams respectively illustrating the arrangements of the LC molecules in the BBVA LCDs according to the first, the second and the third embodiments of the present application. In combination with FIG. 5(c) and FIG. 6(b), while a voltage of 0V is applied to the first electrode 511 (not shown in FIG. 6(b)), a voltage of 7V is applied to the second electrodes 521, 621 and a voltage of 10V is applied to the third electrodes 53, 63, the declination of the LC molecules (i.e. 331' in FIG. 4) is efficiently prevented by the function of fourth electrodes 54, 64 having the same potential as that of the third electrode (53, 63), i.e. 10V. Additionally, the fourth electrodes 54, 64 having a floating potential is also to work. As shown in FIGS. 7(a) and 8(c), the fourth electrode 74 has a floating potential while a voltage of 7V is applied to the second electrode 721 and a voltage of 0V is applied to the first electrode (not shown in FIGS. 7(a) and (b)). It is apparently that the disclination of the LC molecules is also eliminated in this case. That is to say, the voltage difference between the second electrode (i.e. the pixel electrode) and the third electrode (i.e. the biased electrode) can be lowered by such arrangements of the electrodes according to the present invention.

The point worthy to be mentioned is that when the first electrode is 0V, a potential (the biased potential) of the third electrode higher than that of the second electrode is needed when both the potentials of the third and the second electrodes are positive. On the contrary, when the potentials are both negative, a lower potential (the biased potential) of the third electrode is necessary. Furthermore, in the present invention, the biased potential is applied to one of the third and the fourth electrodes while the other one has a floating potential or the biased potential would be applied to both of the third and the fourth electrodes.

On the other hand, the relative positions of the second electrode (521, 621, 721), the third electrode (53, 63, 73) and the fourth electrode (54, 64, 74) are adjusted by controlling the condition of the film-forming, such as the thickness controlling, in a LCD panel manufacturing process.

Figure 9A:
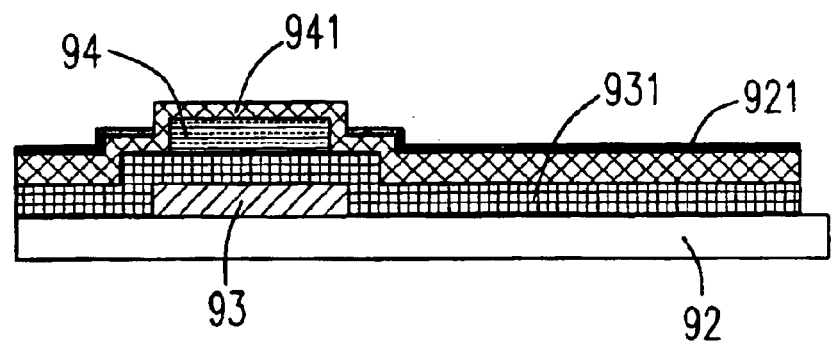
FIGS. 9(a)–9(c) illustrate the relative positions between a fourth electrode and a second electrode in the LCD manufactured in various conditions.
Figure 9B:
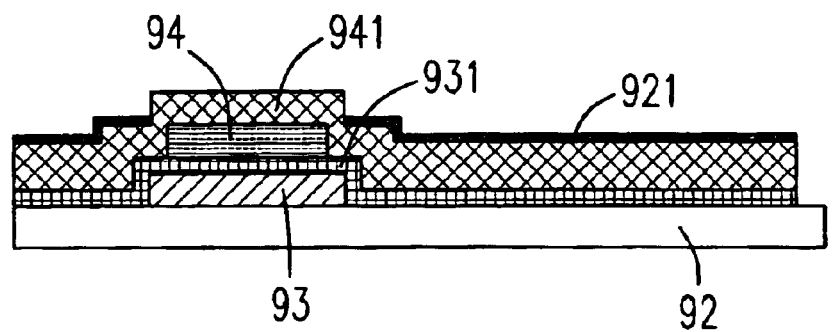
Figure 9C:
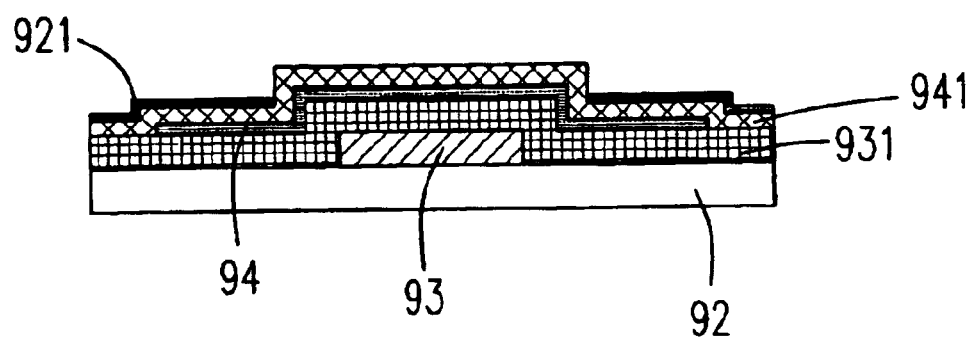

Please refer to FIGS. 9(a)–9(c) illustrating the relative positions between a fourth electrode and a second electrode in the LCD manufactured in different conditions. After the third electrode 93 is formed on the second substrate 92, the insulating layer 931, the fourth electrode 94, the passivation layer 941 and the second electrode 921 are gradually formed in order thereon. By respectively adjusting the thicknesses of the third electrode 93, the fourth electrode 94 and the passivation layer 941, the heights of the fourth electrode 94 and the second electrode 921 are hence controllable. For example, when a thinner passivation layer 941 is formed, the second electrode 921 is controlled to be at a lower position, as shown in FIG. 9(a). On the contrary, the second electrode 921 would be at a higher position when a thicker insulating layer 931 or a thicker passivation layer 941 is formed thereon. As previous description of the first to the third embodiments of the invention, the third electrode 93 has a width larger than that of the hole of the second electrode 921, and the fourth electrode 94 has a width smaller than that of the hole of the second electrode 921. However, according to another embodiment of the invention, FIG. 9(c) illustrates that the third electrode 93 has a width larger than that of the hole of the second electrode 921, and the fourth electrode 94 has a width smaller than that of the hole of the second electrode 921 so that portions of the fourth electrode 94 and the second electrode 921 are overlapping. The optimal thicknesses range of the above layers are that 100~4000 Å for the third electrode 93 and the fourth electrode 94, wherein the range of 1000~4000 Å is preferred, 100~5000 Å for the insulating layer 931, wherein the range of 1000~5000 Å is preferred, and 200~2500 Å for the second electrode 921.

Figure 10:
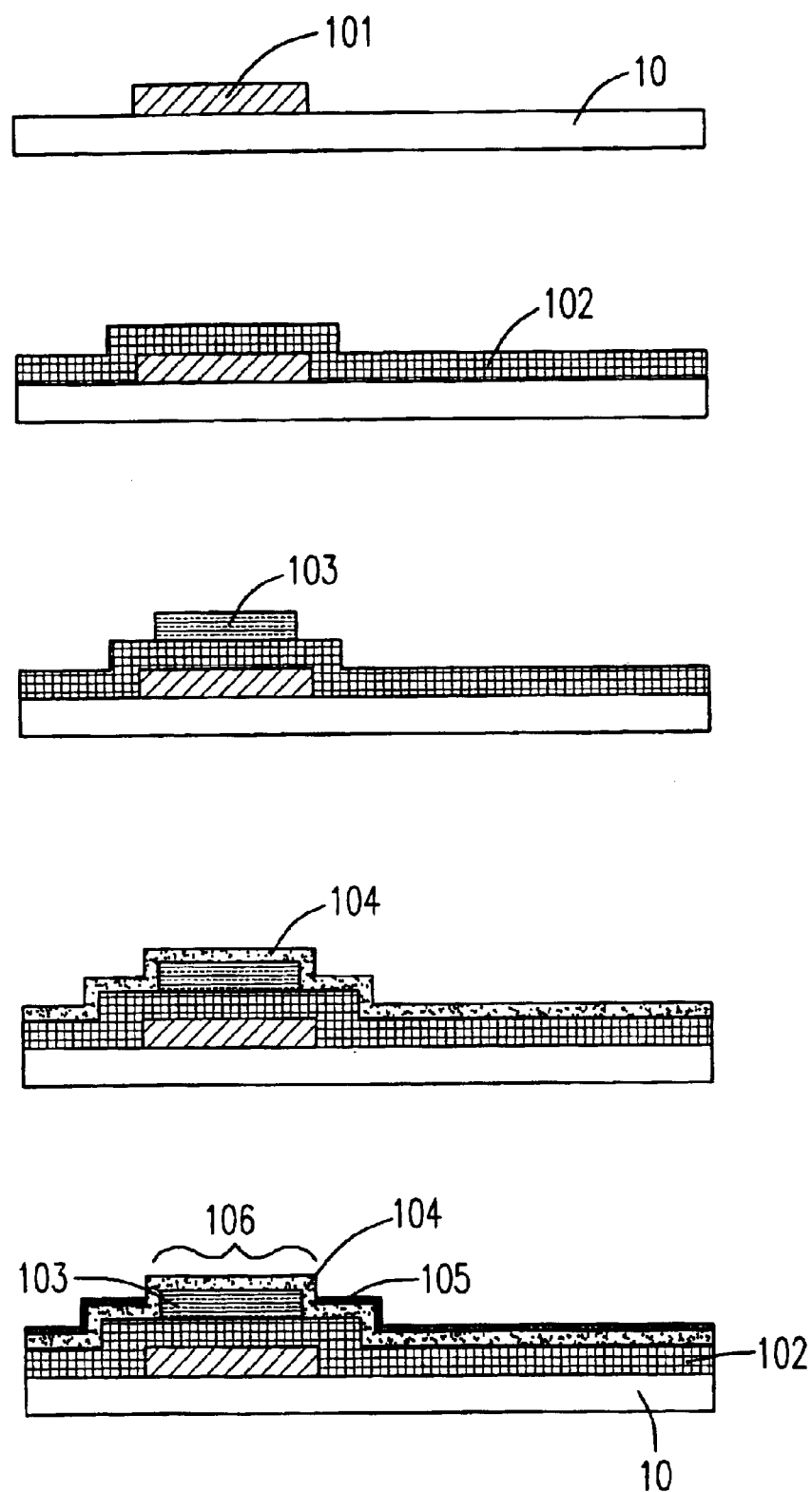
FIG. 10 is a diagram illustrating the method for manufacturing the LCD according to the present invention.

Please refer to FIGS. 5(a), 6(a), 7(a) and 10, wherein FIG. 10 is a diagram illustrating the method for manufacturing the LCD according to the present invention. Firstly, a first substrate 10 is provided and a first electrode 101 with a thickness in a range of 100~4000 Å is formed thereon. In addition, there are same scanning lines, not shown in FIG. 10, but could be found in FIGS. 5(a), 6(a) and 7(a), are simultaneously formed. The first electrode 101 and the scanning lines are made of the same metal layer. Secondly, an insulating layer 102 having a thickness in a range of 100~5000 Å is formed on the first substrate 10 to cover the first electrode 101 and the scanning lines, wherein the preferred thickness range of the insulating layer 102 is in 1000~5000 Å. Then a second electrode 103 and the data lines, not shown in FIG. 10, but could be found in FIGS. 5(a), 6(a) and 7(a), are simultaneously formed on the insulating layer 102, wherein the second electrode 103 and the data lines are made of the same metal layer. Thirdly, a passivation layer 104 is formed on the second electrode 103 to cover the second electrode 103 and the data lines, wherein the thickness of the second electrode 103 is in a range of 100~5000 Å and more preferably in 1000~5000 Å. Finally, a third electrode 105 with a thickness in a range of 200~2500 Å is formed on the passivation layer 104. Moreover, at least a hole 106 is formed on the third electrode 105 and plural slits (not shown) are formed nearby the both sides of the hole 106.

Based on the above, the present invention improves the fringe field effect on the LC molecule arrangements in the conventional BBVA (Biased Bending Vertical Alignment) LCD. By providing the design of the fourth electrode, the disclination of the LC molecules is efficiently inhibited without a high additional voltage applying. Besides, by utilizing the method for manufacturing the LCD provided in the present invention, the complicated processes for manufacturing the bumps and the patterning CF (Color Filter) ITO (Indium Tin Oxide) glass respectively in the MVA LCD and the PVA (Patterned Vertical Alignment) LCD are no more needed. Hence, the present invention not only has novelty and progressiveness, but also has an industry utility.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A liquid crystal display comprising:
   a first substrate having a first electrode thereon;
   a second substrate having a second electrode having at least a hole, wherein said second electrode faces to said first electrode;
   a liquid crystal layer located between said first substrate and said second substrate;
   a third electrode located between said second electrode and said second substrate, wherein said third electrode is located corresponding to said hole of said second electrode; and
   a fourth electrode located on said third electrode, wherein said fourth electrode has at least a portion located inside said hole of said second electrode.

2. The liquid crystal display according to claim 1, wherein said second electrode further has plural slits and each of said plural slits is located on a defined side of said hole.

3. The liquid crystal display according to claim 2, wherein each of said plural slits has a longitudinal direction in parallel to that of said third electrode.

4. The liquid crystal display according to claim 1, wherein said hole of said second electrode is an elongated hole.

5. The liquid crystal display according to claim 4, wherein said elongated hole has a longitudinal direction parallel to that of said third electrode and said fourth electrode.

6. The liquid crystal display according to claim 4, wherein said elongated hole has a longitudinal direction perpendicular to that of said third electrode and said forth electrode.

7. The liquid crystal display according to claim 4, wherein said elongated hole has a longitudinal direction perpendicular to that of said third electrode and said fourth electrode further has at least an island-shaped electrode.

8. The liquid crystal display according to claim 7, wherein said island-shaped electrode has a longitudinal direction parallel to that of said elongated hole.

9. The liquid crystal display according to claim 7, wherein said island-shaped electrode has a longitudinal direction perpendicular to that of said elongated hole.

10. The liquid crystal display according to claim 1, wherein said third electrode has a width larger than that of said hole of said second electrode, and said fourth electrode has a width smaller than that of said hole of said second electrode.

11. The liquid crystal display according to claim 1, wherein said third electrode has a width smaller than that of said hole of said second electrode, and said fourth electrode has a width larger than that of said hole of said second electrode.

12. The liquid crystal display according to claim 1, wherein said third electrode and said fourth electrode have an equal electric potential.

13. The liquid crystal display according to claim 1, wherein said third electrode has a floating potential and said fourth electrode has a biased potential.

14. The liquid crystal display according to claim 1, wherein said third electrode has a biased potential and said fourth electrode has a floating potential.

15. The liquid crystal display according to claim 1, wherein said third electrode and said fourth electrode are respectively made of a first metal layer and a second metal layer and an insulating layer is further comprised and located between said third electrode and said fourth electrode.

16. The liquid crystal display according to claim 15, wherein said fourth electrode and said insulating layer further have a passivation layer thereon and said second electrode is located on said passivation layer.

17. The liquid crystal display according to claim 16, wherein said passivation layer has a thickness in a range of 100~5000 Å.

18. The liquid crystal display according to claim 16, wherein said second electrode has a thickness in a range of 200~2500 Å.

19. The liquid crystal display according to claim 15, wherein said third electrode and said fourth electrode have a thickness in a range of 100~4000 Å, respectively.

20. The liquid crystal display according to claim 15, wherein said insulating layer has a thickness in a range of 100~5000 Å.

21. A method for manufacturing a liquid crystal display, comprising the following steps:

providing a substrate;

forming a first electrode on said substrate;

forming an insulating layer on said substrate to cover said first electrode;

forming a second electrode on said insulating layer;

forming a passivation layer on said substrate to cover said insulating layer and said second electrode; and forming a third electrode on said passivation layer, wherein said third electrode has at least a hole thereon and said first electrode and said second electrode are located respectively corresponding to said hole.

22. The method according to claim 21, wherein said first electrode and said second electrode are made of a first metal layer and a second metal layer, respectively.

23. The method according to claim 21, wherein said third electrode further has plural slits and each of said plural slits is located on a defined side of said hole.

24. The method according to claim 23, wherein each of said plural slits has a longitudinal direction in parallel to that of said first electrode.

25. The method according to claim 21, wherein said hole of said third electrode is an elongated hole.

26. The method according to claim 25, wherein said elongated hole has a longitudinal direction parallel to that of said first electrode and said second electrode.

27. The method according to claim 25, wherein said elongated hole has a longitudinal direction perpendicular to that of said first electrode and said second electrode.

28. The method according to claim 25, wherein said elongated hole has a longitudinal direction in perpendicular to that of said first electrode and said second electrode further has at least an island-shaped electrode.

29. The method according to claim 28, wherein said island-shaped electrode has a longitudinal direction parallel to that of said elongated hole.

30. The method according to claim 28, wherein said island-shaped electrode has a longitudinal direction perpendicular to that of said elongated hole.

31. The method according to claim 21, wherein said first electrode has a width larger than that of said hole of said third electrode, and said second electrode has a width smaller than that of said hole of said third electrode.

32. The method according to claim 21, wherein said first electrode has a width smaller than that of said hole of said third electrode, and said second electrode has a width larger than that of said hole of said third electrode.

33. The method according to claim 21, wherein said first electrode and said second electrode have a thickness in a range of 100~4000 Å, respectively.

34. The method according to claim 21, wherein said insulating layer has a thickness in a range of 100~5000 Å.

35. The method according to claim 21, wherein said passivation layer has a thickness in a range of 100~5000 Å.

36. The method according to claim 21, wherein said third electrode has a thickness in a range of 200~2500 Å.

* * * * *